(12) United States Patent
Kimura et al.

(10) Patent No.: US 8,647,694 B2
(45) Date of Patent: Feb. 11, 2014

(54) GROOVED NOODLE

(75) Inventors: Ryusuke Kimura, Saitama (JP); Kenta Asahina, Saitama (JP); Fusaki Kajio, Saitama (JP); Yuki Oba, Saitama (JP)

(73) Assignee: Nisshin Foods, Inc., Tokyo (JP)

( * ) Notice: Subject to any disclaimer, the term of this patent is extended or adjusted under 35 U.S.C. 154(b) by 55 days.

(21) Appl. No.: 13/102,312

(22) Filed: May 6, 2011

(65) Prior Publication Data

US 2012/0135123 A1 May 31, 2012

(30) Foreign Application Priority Data

Nov. 30, 2010 (JP) .................... 2010-266058

(51) Int. Cl.
*A23L 1/16* (2006.01)

(52) U.S. Cl.
USPC .......................................... 426/557

(58) Field of Classification Search
None
See application file for complete search history.

(56) References Cited

U.S. PATENT DOCUMENTS

| | | | |
|---|---|---|---|
| 4,752,205 A | 6/1988 | Moriyama et al. |
| 4,816,281 A | 3/1989 | Moriyama et al. |

FOREIGN PATENT DOCUMENTS

| | | | |
|---|---|---|---|
| AU | 72817/91 B | * | 11/1992 |
| JP | 60-006172 | | 1/1985 |
| JP | 2001-017104 | | 1/2001 |
| WO | WO 2008090802 A1 | * | 7/2008 |

* cited by examiner

*Primary Examiner* — Humera Sheikh
*Assistant Examiner* — Subbalakshmi Prakash
(74) *Attorney, Agent, or Firm* — Muncy, Geissler, Olds & Lowe, PLLC

(57) ABSTRACT

A grooved noodle comprises: a core located at a center position of a noodle in cross section and having a circular shape with a diameter being 26% to 41% of a diameter of the noodle; and hook-shaped portions formed on a periphery of the core due to existences of grooves each extending spirally from the periphery of the core to a surface of the noodle, each hook-shaped portion having a leg with a width in a range of 18% to 30% of the diameter of the noodle and a blade extending from an outer end of the leg, an outer periphery of the blade extending along an arc from its base connected to the leg to its tip, the base being located further inwardly toward the center of the noodle than the tip.

3 Claims, 3 Drawing Sheets

GROOVED NOODLE

BACKGROUND OF THE INVENTION

The present invention relates to a grooved noodle and particularly to a noodle formed with a plurality of grooves along a longitudinal direction of the noodle and having a substantially circular configuration in cross section.

In the prior art, there has been proposed a noodle having one or more slit or groove along a longitudinal direction of a noodle with an object of achieving a shortened cooking time. For example, JP 1985-6172 A discloses a noodle having four wedge-shaped grooves with a depth not reaching the center of the cross section thereof, and another noodle having a single wedge-shaped or rectangular-shaped groove with a depth reaching the center of the cross section thereof.

The noodle having wedge-shaped grooves with a depth not reaching the center of the noodle can certainly shorten the cooking time in boiling water as compared with a noodle without grooves but fails to significantly reduce the cooking time because such shallow grooves did not assist in quickly conducting heat to the inside of the noodle during cooking. On the other hand, the noodle formed with a wedge-shaped or rectangular-shaped groove with a depth reaching the center of the noodle achieves shortening of the cooking time by a maximum of about a half as compared with a noodle without grooves but then is difficult to be cooked in such a way that the noodle gives a good texture (al dente) slightly having a half-boiled core portion that is pleasant to the taste as required of spaghetti, for example, because the core portion of the noodle is boiled too quickly.

JP 2001-17104 A proposes a quickly edible spaghetti with four substantially rectangular and equally spaced grooves having a depth of 20% to 30% of a diameter of a circular cross section of thereof to obtain a texture slightly having a half-boiled core.

SUMMARY OF INVENTION

However, each of the grooves exemplified in JP 2001-17104 A specifically has an opening width of 0.3 mm and a bottom width of 0.4 mm against a depth of 0.45 mm in the cross section of the noodle. With such rectangular grooves having a large width, the grooves in the boiled noodle may not be fully closed, and as a result the noodle may have a texture different from a noodle without grooves.

Further, each of the grooves described in JP 2001-17104 A has a substantially rectangular cross section having a depth of only 20% to 30% of the diameter of the noodle and has a surface area smaller than that of the wedge-shaped groove or the rectangular-shaped groove reaching the center of the noodle as described in JP 1985-6172 A. Therefore, the spaghetti described in JP 2001-17104 A, although being formed with the four rectangular grooves in each noodle, only permits shortening of cooking time to about a half compared with a non-grooved noodle.

The present invention is made to overcome the above problems of the prior art and has an object of providing a grooved noodle which can achieve remarkable reduction in cooking time as compared with a non-grooved noodle and give an excellent texture.

A grooved noodle according to the present invention has a plurality of grooves formed along the noodle having a substantially circular configuration in cross section, and the grooved noodle comprises:

a core located at a center of the noodle in cross section and having a cross sectional shape of a substantial circle with a diameter being 26% to 41% of a diameter of the noodle; and a plurality of hook-shaped portions formed on a periphery of the core and oriented in a same rotational direction due to existences of the grooves each having a cross sectional shape so as to extend from the periphery of the core to a surface of the noodle along a spirally curved line with the core as a center thereof, each of the hook-shaped portions having a leg extending from the core in a substantially radial direction with respect to the noodle and a blade extending from an outer end of the leg in a substantially circumferential direction of the noodle in cross section, the leg of each hook-shaped portion having a width of 18% to 30% of the diameter of the noodle in cross section, an outer periphery of the blade of each hook-shaped portion extending along an arc from its base connected to the leg to its tip in cross section, the base being located further inwardly toward the center of the noodle than the tip.

DETAILED DESCRIPTION OF THE INVENTION

Figure 1:
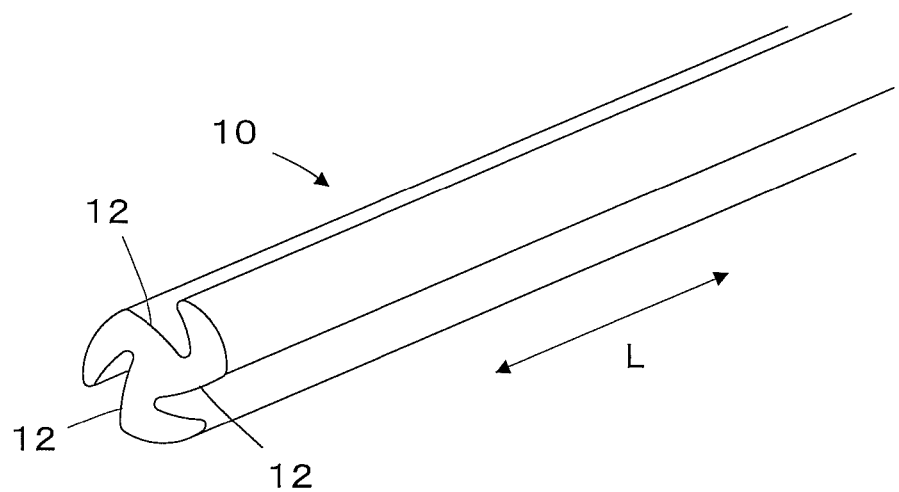
FIG. 1 is a perspective view illustrating a part of a grooved noodle of Embodiment 1 according to the invention.

The present invention is described in detail below based on the preferred embodiments shown in the drawings.

Embodiment 1

FIG. 1 illustrates a grooved noodle 10 of Embodiment 1. The noodle 10 is a dry spaghetti extending in a direction L of the noodle shown in FIG. 1. The noodle 10 has three grooves 12 extending along the direction L in its outer periphery.

Figure 2:
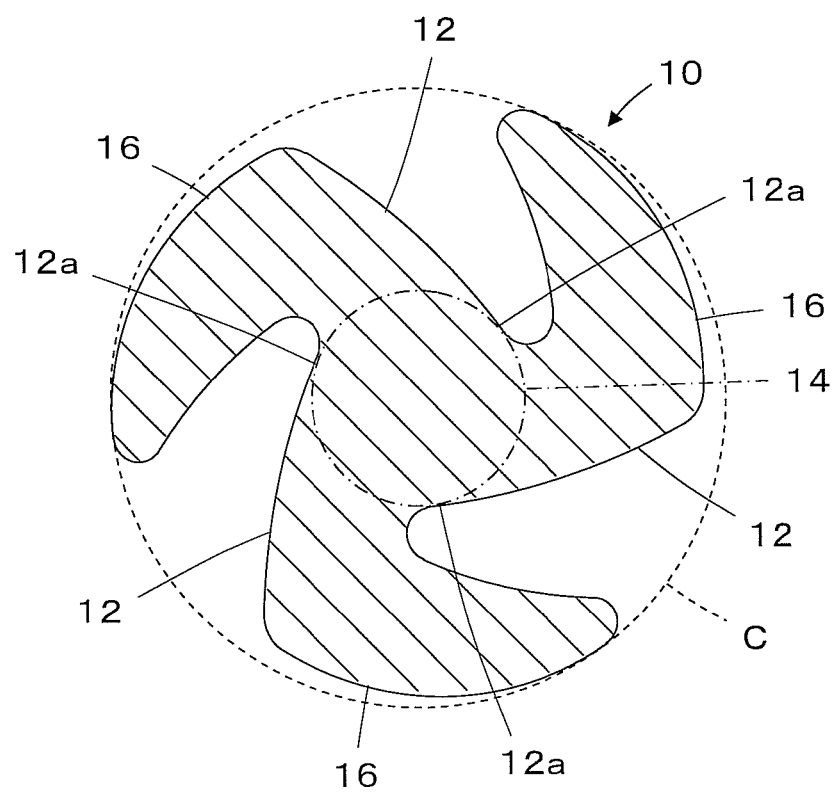
FIG. 2 is a cross sectional view illustrating the grooved noodle of Embodiment 1.

As illustrated in FIG. 2, the noodle 10 has a substantially circular configuration in cross section. That is, suppose that the noodle 10 is not provided with the three grooves 12, it would be in the form of a substantial circle C in cross section. Further, a substantially circular core 14 is secured at the center of the cross section of the noodle 10. The core 14 is a solid region in which no grooves 12 exist.

Each of the grooves 12 has a cross-sectional shape so as to extend from the periphery of the core 14 to the surface of the noodle 10 along a spirally curved line with the core 14 as its center. A lateral side 12a of the deepest portion of each grooves is in contact with the periphery of the core 14 so as to extend in a tangential direction of the circumference of the core 14, and each of the grooves 12 has a groove width gradually increasing from the periphery of the core 14 to the surface of the noodle 10.

The three grooves 12 have the same cross section curving in the same rotational direction and are arranged by equal spaces along a circumferential direction of the noodle 10.

With the grooves 12 thus formed, three hook-shaped portions 16 directed in the same rotational direction are formed on the periphery of the core 14 in the cross section of the noodle 10.

Figure 3:
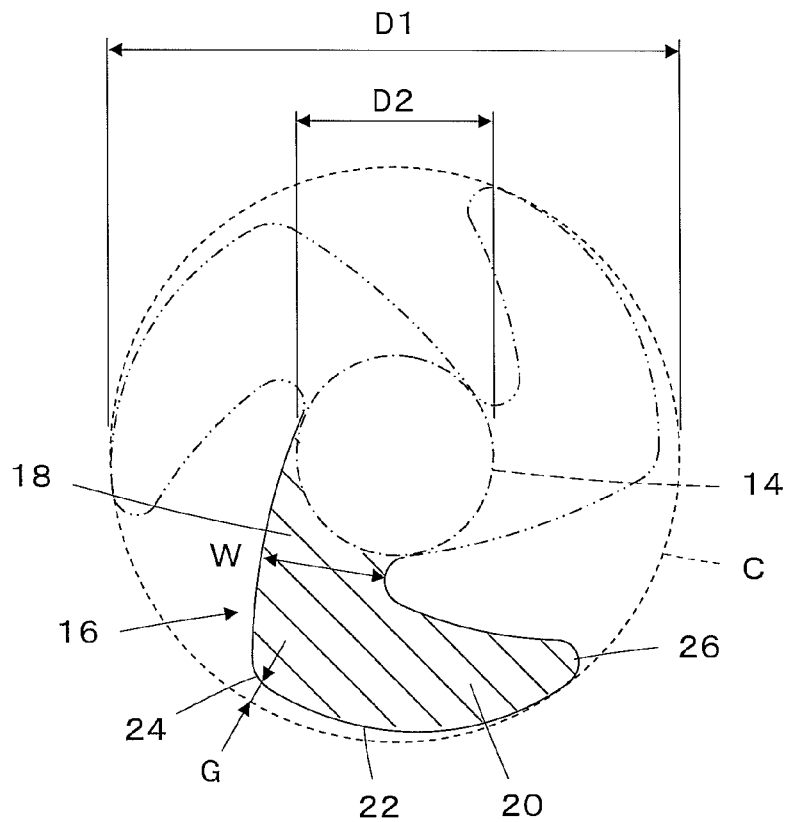
FIG. 3 is a cross sectional view illustrating one hook-shaped portion of the grooved noodle of Embodiment 1.

The shaded area in FIG. 3 designates one hook-shaped portion 16. The hook-shaped portion 16 has a leg 18 extending from the core 14 in a substantially radial direction with respect to the noodle 10 and a blade 20 extending from the outer end of the leg 18 substantially in the circumferential direction of the noodle 10. The leg 18 and the blade 20 are smoothly connected to each other and together form a hooked configuration. An outer periphery 22 of the blade 20 extends along an arc from its base 24 of the blade 20 connected to the leg 18 to its tip 26 of the blade 20, the base 24 being located further inwardly toward the center of the noodle 10 than the tip 26. Accordingly, as illustrated in FIG. 3, the tip 26 side of the outer periphery 22 is in contact with the circle C representing the substantially circular configuration of the noodle 10 while the base 24 side of the outer periphery 22 is located in a receding position from the circle C by a distance of G.

The tip 26 of the blade 20 is not pointed but rounded with a given radius of curvature.

A diameter D2 of the substantially circular core 14 is set to a value of 26% to 41% of a diameter D1 of the noodle 10, that is, a diameter of the circle C representing the configuration of the noodle 10 while the width W of the leg 18 of each hook-shaped portion 16 is set to a value of 18% to 30% of the diameter D1 of the noodle 10.

Although a size of the noodle 10 is not specifically limited, the diameter D1 of the noodle 10 may be set to, for example, 1.8 mm to 2.8 mm, and a length of the noodle 10 may be set to, for example, 250 mm or 165 mm.

The grooved noodle 10 having such configuration can be produced by extruding raw materials of the noodle from a die with a through-hole corresponding to the cross section of the noodle illustrated in FIG. 2, and by drying thereafter.

When the noodle 10 is placed in water of high-temperature and boiled for cooking, water and heat penetrate the noodle 10 through the outer peripheral surface thereof. In this process, hot water also enters the three grooves 12, and thus water and heat infiltrate into the noodle 10 through not only the peripheral surface of the noodle 10 but the inner walls of the three grooves 12. As described above, each of the grooves 12 extends along the curved line from the periphery of the core 14 to the surface of the noodle 10 in cross section and, therefore, has a larger surface area. Thus, water and heat are quickly and efficiently absorbed into the noodle 10.

However, the core 14 exists at the center in cross section of the noodle 10, and the grooves 12 do not reach the core 14. This configuration makes it hard for water and heat to penetrate the core 14. Therefore, when regions of the noodle 10 other than the core 14 have been sufficiently edible (cooked or gelatinized), the core 14 is still slightly half-boiled.

Due to the existence of the three grooves 12 and the core 14, it enables cooking to be edible within a significantly short time while allowing a good texture (al dente) slightly having a half-boiled region at the center of the noodle 10. The favorable texture can be obtained even when the noodle is quickly cooked using, for example, a microwave oven.

Further, the noodle 10 absorbs water and expands when cooked in boiling water, whereupon the three grooves 12 are closed. Since the outer periphery 22 of the blade 20 of each hook-shaped portion 16 is configured such that the base 24 side is located further inwardly than the tip 26 side, the tip 26 of the blade 20 of each hook-shaped portion 16 is connected with the base 24 of the blade 20 of the adjacent hook-shaped portion 16 at substantially the same position, resulting in that the noodle 10 becomes to have a substantially circular cross section. Further, since each of the grooves 12 has a width gradually increasing from the periphery of the core 14 to the surface of the noodle 10, that is, a width gradually decreasing from the opening end at the surface of the noodle 10 to the deepest portion of the groove, the grooves 12 can be easily closed upon boiling of the noodle 10. Thus, the boiled noodle 10 has an external appearance and a touch feeling similar to those of a noodle without grooves.

Grooved noodles have been actually produced by varying a ratio D2/D1, i.e., a ratio of the diameter D2 of the core 14 to the diameter D1 of the noodle 10, and a strength of each noodle before boiling have been measured and a texture of each noodle after boiling for 3 minutes have been evaluated. The results are shown in Table 1

TABLE 1

|  | D2/D1 | noodle strength | noodle texture |
| --- | --- | --- | --- |
| example 1 | 17% | X weak and fragile | X soft and fragile |
| example 2 | 20% | Δ slightly weak | Δ soft |
| example 3 | 23% | Δ slightly weak | Δ soft |
| example 4 | 26% | ○ moderately strong | ○ a little soft but good |
| example 5 | 29% | ○ moderately strong | ○ a little soft but good |
| example 6 | 32% | ○ moderately strong | ⊚ al-dente texture and excellent |
| example 7 | 35% | ⊚ strong and hard to crack | ⊚ al-dente texture and excellent |
| example 8 | 38% | ⊚ strong and hard to crack | ○ a little hard but good |
| example 9 | 41% | ⊚ strong and hard to crack | ○ a little hard but good |
| example 10 | 44% | ⊚ strong and hard to crack | Δ hard |
| example 11 | 47% | ⊚ strong and hard to crack | Δ hard |
| example 12 | 50% | ⊚ strong and hard to crack | X hard and not boiled sufficiently |

The strength of a noodle before boiling decreases with the ratio D2/D1, that is, the smaller the ratio D2/D1 is, the weaker and easier to crack the noodle is, and the larger the ratio D2/D1 is, the stronger and harder to crack the noodle is. Besides, the smaller the ratio D2/D1 is, the softer texture the boiled noodle has, and the larger the ratio D2/D1 is, the harder texture the boiled noodle has. It has been found that when the ratio D2/D1 is in a range of 26% to 41%, the noodle is moderately strong and hard to crack, and an al-dente texture can be obtained, producing an excellent balance between noodle strength and texture.

Thus, the diameter D2 of the core 14 is set to a value of 26% to 41% of the diameter D1 of the noodle 10.

Further, grooved noodles have been produced by varying a ratio W/D1, i.e., the ratio of a width W of the leg 18 of each hook-shaped portion 16 to the diameter D1 of the noodle 10, and a strength of each noodle before boiling have been measured and a texture of each noodle after boiling for 3 minutes have been evaluated. The results are shown in Table 2.

TABLE 2

|  | W/D1 | noodle strength | noodle texture |
| --- | --- | --- | --- |
| example 13 | 9% | X weak and fragile | X soft and fragile |
| example 14 | 12% | Δ slightly weak | Δ soft |
| example 15 | 15% | Δ slightly weak | Δ soft |
| example 16 | 18% | ○ moderately strong | ○ a little soft but good |
| example 17 | 21% | ⊚ strong and hard to crack | ⊚ al-dente texture and excellent |
| example 18 | 24% | ⊚ strong and hard to crack | ⊚ al-dente texture and excellent |
| example 19 | 27% | ⊚ strong and hard to crack | ⊚ al-dente texture and excellent |

TABLE 2-continued

| | W/D1 | noodle strength | noodle texture |
|---|---|---|---|
| example 20 | 30% | ◉ strong and hard to crack | ○ a little hard but good |
| example 21 | 33% | ◉ strong and hard to crack | △ hard |
| example 22 | 36% | ◉ strong and hard to crack | △ hard |
| example 23 | 39% | ◉ strong and hard to crack | X hard and not boiled sufficiently |

As in the case where the ratio D2/D1 of the diameter D2 of the core 14 to the diameter D1 of the noodle 10 is varied, the smaller the ratio W/D1 is, the weaker and easier to crack the noodle before boiling is, and the larger the ratio W/D1 is, the stronger and harder to crack the noodle before boiling is. Besides, the smaller the ratio W/D1 is, the softer texture the boiled noodle has, and the larger the ratio W/D1 is, the harder texture the boiled noodle has. It has been found that when the ratio W/D1 is in a range of 18% to 30%, the noodle is moderately strong and hard to crack, and an al-dente texture can be obtained, producing an excellent balance between noodle strength and texture.

Thus, the width W of the leg region 18 of each hook-shaped portion 16 is set to a value of 18% to 30% of the diameter D1 of the noodle 10.

Further, grooved noodles have been produced by varying a radius of curvature of the tip 26 of the blade 20 of each hook-shaped portion 16 to see whether scale-like irregular defects were generated in the tip 26 of each blade 20 or not when raw materials are extruded from a die and observe a seam between the base 24 of one blade 20 and the tip 26 of the other blade 20 in a pair of hook-shaped portions 16 adjacent to each other of each noodle after boiling for 3 minutes.

TABLE 3

| | radius of curvature (mm) | generation of scale-like irregularities | seams in noodle surface |
|---|---|---|---|
| example 24 | 0.04 | X generated | ◉ hardly exist |
| example 25 | 0.05 | △ occasionally generated | ○ invisible |
| example 26 | 0.06 | △ occasionally generated | ○ invisible |
| example 27 | 0.07 | ◉ not generated | ○ invisible |
| example 28 | 0.08 | ◉ not generated | ○ invisible |
| example 29 | 0.09 | ◉ not generated | ○ invisible |
| example 30 | 0.10 | ◉ not generated | ○ invisible |
| example 31 | 0.11 | ◉ not generated | ○ invisible |
| example 32 | 0.12 | ◉ not generated | ○ invisible |
| example 33 | 0.13 | ◉ not generated | ○ invisible |
| example 34 | 0.14 | ◉ not generated | ○ invisible |
| example 35 | 0.15 | ◉ not generated | △ visible |

The smaller the radius of curvature in the tip 26 of the blade 20 is, the more inconspicuous the seams in the noodle surface become but the more easily the scale-like irregularities are generated. Conversely, the larger the radius of curvature increases is, the less the scale-like irregularities are generated but the more conspicuous the seams in the noodle surface become. It has been found that when the radius of curvature is in a range of 0.07 mm to 0.14 mm, no scale-like irregularities are generated while the seams in the noodle surface are invisible to the naked eye.

Thus, the tip 26 of the blade 20 of each hook-shaped portion 16 is preferably curved with a radius of curvature in a range of 0.07 mm to 0.14 mm.

Although each of the grooves 12 illustrated in FIG. 2 has an inner periphery and an outer periphery both curved in cross section, the invention is not limited thereto. The configuration may be such that only one of the inner and outer peripheries of each groove 12 is curved and the other is straight.

Further, although each of the grooves 12 illustrated in FIG. 2 has a rounded deepest portion, the configuration thereof is not limited this way and the deepest portion may be pointed.
Embodiment 2

Figure 4:
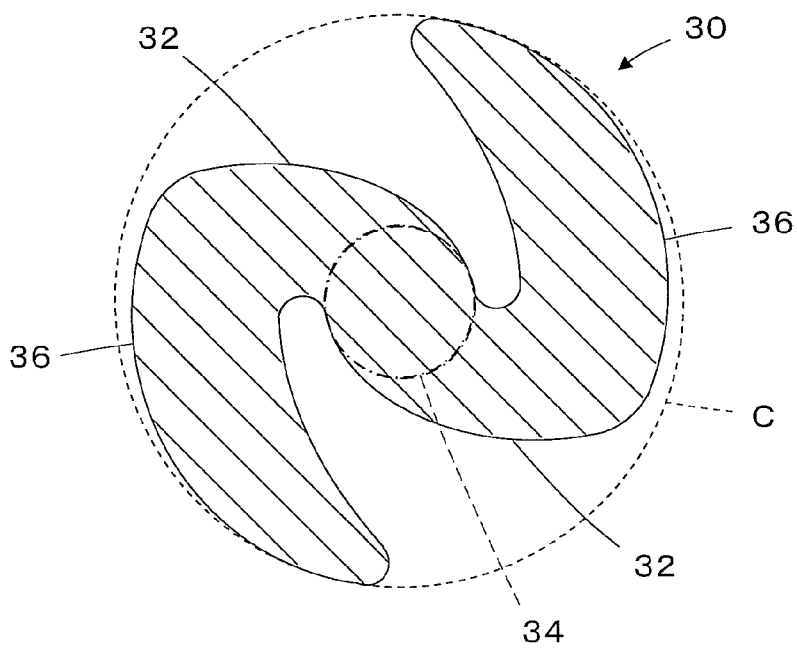
FIG. 4 is a cross sectional view illustrating a grooved noodle of Embodiment 2.

FIG. 4 illustrates a grooved noodle 30 of Embodiment 2. While the grooved noodle 10 of Embodiment 1 illustrated in FIG. 2 has three grooves 12, the grooved noodle 30 of Embodiment 2 has only two grooves 32 formed therein so as to extend along a direction of the noodle 30.

Like the grooved noodle 10 of Embodiment 1, the noodle 30 has a substantially circular main configuration and a core 34 is secured at the center of the noodle 30 in cross section. The two grooves 32 are provided at equal spacing along the circumferential direction of the noodle 30, that is, in opposite direction from each other. Each of the grooves 32 has a cross-sectional shape so as to extend from the periphery of the core 34 to the surface of the noodle 30 along a spirally curved line with the core 34 as its center and has a groove width gradually increasing from the periphery of the core 34 to the surface of the noodle 30.

With the two grooves 32 thus formed, two hook-shaped portions 36 directed in the same rotational direction are formed on the periphery of the core 34 in the cross section of the noodle 30. Like Embodiment 1, an outer periphery of a blade of each hook-shaped portion 36 has a base located further inwardly toward the center of the noodle 30 than a tip. The diameter of the core 34 is set in a range of 26% to 41% of the diameter of the circle C representing the substantially circular main configuration of the noodle 30 while a width of a leg of each hook-shaped portion 36 is set to a value of 18% to 30% of the diameter of the noodle.

Such grooved noodle 30 is also moderately strong and hard to crack, and can quickly become edible (cooked or gelatinized), to close the two grooves 32 so that substantially the same external appearance as a noodle without grooves is obtained and an excellent al-dente texture is obtained.
Embodiment 3

Figure 5:
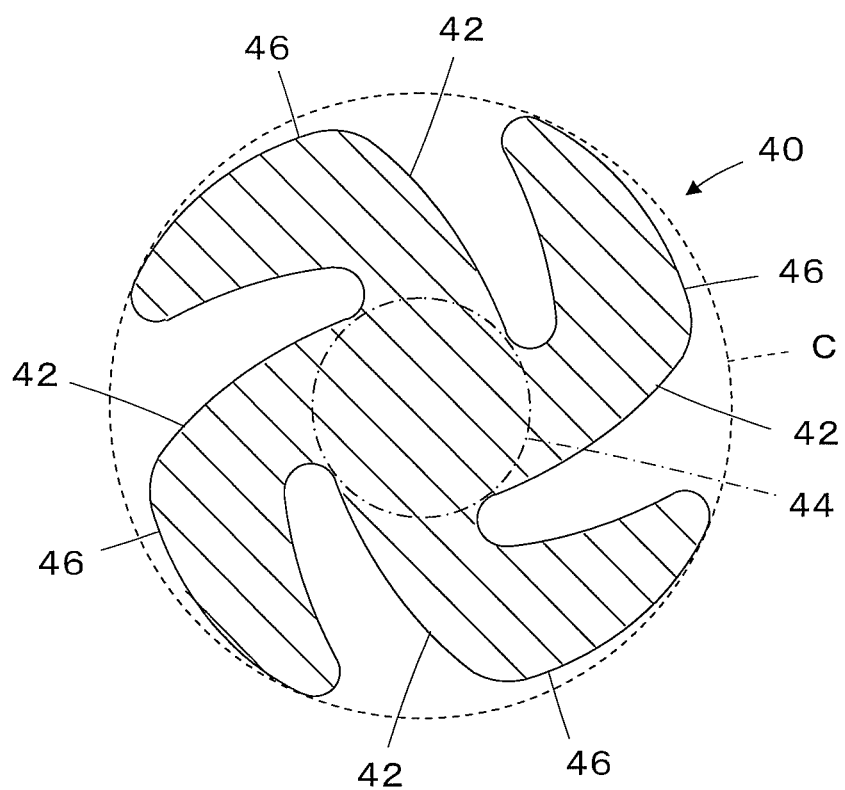
FIG. 5 is a cross sectional view illustrating a grooved noodle of Embodiment 3.

FIG. 5 illustrates a grooved noodle 40 of Embodiment 3. The grooved noodle 40 has four grooves 42 formed therein so as to extend along a direction of the noodle 40.

The noodle 40 has a substantially circular configuration and a substantially circular core 44 is secured at the center of the noodle 40 in cross section. The four grooves 42 are arranged by substantially equal spaces along the circumferential direction of the noodle 40, each having a cross-sectional shape so as to extend from the periphery of the core 44 to the surface of the noodle 40 along a spirally curved line with the core 44 as its center and having a groove width gradually increasing from the periphery of the core 44 to the surface of the noodle 40.

With the four grooves 42 thus formed, four hook-shaped portions 46 directed in the same rotational direction are formed in the periphery of the core 44 in the cross section of the noodle 40. As well as Embodiments 1 and 2, an outer periphery of a blade of each hook-shaped portion 46 has a base located further inwardly toward the center of the noodle 40 than a tip. The diameter of the core 44 is set in a range of 26% to 41% of the diameter of the circle C representing the substantially circular main configuration of the noodle 40 while a width of a leg of each hook-shaped portion 46 is set in a range of 18% to 30% of the diameter of the noodle.

Such grooved noodle 40 is also moderately strong and hard to crack, and can quickly become edible (cooked or gelatinized) to close the four grooves 42 so that substantially the same external appearance as a noodle without grooves is obtained and an excellent al-dente texture is obtained.

Besides pasta such as spaghetti, the present invention may be applied to various kinds of noodles including buckwheat noodles (Soba), wheat noodles (Udon), and Chinese noodles (Ramen).

The present invention is also applicable to various types of noodles, such as raw noodles, boiled noodles, steamed noodles, and instant noodles, in addition to dry noodles. Especially, dry noodles require a longer cooking time compared to raw noodles, etc., achieving a much shortened cooking time effect according to the present invention. Dry noodles using the present invention may be produced by molding raw noodles such that they become grooved noodles in accordance with the invention upon drying, conditioned drying the molded raw noodles, followed by cooling.

When the noodles are produced using extrusion molding, noodle production and groove formation can be achieved simultaneously by matching the shape of through-holes of a die with the shape of the cross-section of the noodle, thus making an application of the invention easier.

What is claimed is:

1. A grooved noodle having a plurality of grooves formed along the noodle and having a substantially circular configuration in cross section, the grooved noodle comprising:
    a core located at a center position of the noodle in cross section and having a cross sectional shape of a substantial circle with a diameter being 26% to 41% of a diameter of the noodle; and
    a plurality of hook-shaped portions formed on a periphery of the core and oriented in a same rotational direction due to existence of the grooves, each groove having a cross sectional shape so as to extend from the periphery of the core to a surface of the noodle along a spirally curved line with the core as a center thereof,
    wherein each of the hook-shaped portions has a leg extending from the core in a substantially radial direction with respect to the noodle and a blade extending from an outer end of the leg in a substantially circumferential direction of the noodle in cross section, each of the grooves has a width gradually increasing from the periphery of the core to the surface of the noodle,
    wherein the leg of each hook-shaped portion has a width of 18% to 30% of the diameter of the noodle in cross section,
    wherein an outer periphery of the blade of each hook-shaped portion extends along an arc from a base of the blade, which is connected to the leg, to a tip of the blade in cross section, the base being located further inwardly toward the center of the noodle than the tip so that the tip of the outer periphery of the blade of each hook-shaped portion is in contact with a circle representing the substantially circular configuration of the noodle while the base of the outer periphery of the blade of each hook-shaped portion is located in a receding position from the circle by a given distance,
    wherein the plurality of grooves are those selected from two grooves, three grooves and four grooves arranged by equal spaces.

2. The grooved noodle according to claim 1, wherein the tip of the blade of each hook-shaped portion is curved with a given radius of curvature in cross section.

3. The grooved noodle according to claim 1, wherein a lateral side of the deepest portion of each groove is in contact with the periphery of the core so as to extend in a tangential direction of the circumference of the core in cross section.

\* \* \* \* \*